US010080171B2

(12) United States Patent
Murphy (10) Patent No.: US 10,080,171 B2
(45) Date of Patent: Sep. 18, 2018

(54) CONTINUOUS COMMUNICATION FOR PRIORITIZED USER DEVICE APPLICATIONS

(71) Applicant: T-Mobile USA, Inc., Bellevue, WA (US)

(72) Inventor: Sean Patrick Murphy, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 75 days.

(21) Appl. No.: 15/378,042

(22) Filed: Dec. 14, 2016

(65) Prior Publication Data

US 2018/0167858 A1 Jun. 14, 2018

(51) Int. Cl.
*H04W 4/00* (2018.01)
*H04W 36/18* (2009.01)
(Continued)

(52) U.S. Cl.
CPC .......... *H04W 36/18* (2013.01); *H04W 48/18* (2013.01); *H04W 72/10* (2013.01); *H04W 76/025* (2013.01); *H04W 76/045* (2013.01); *H04W 76/15* (2018.02); *H04W 76/25* (2018.02); *H04L 65/1016* (2013.01); *H04W 88/16* (2013.01)

(58) Field of Classification Search
CPC . H04W 36/18; H04W 36/0022; H04W 76/15; H04W 76/18
See application file for complete search history.

(56) References Cited

U.S. PATENT DOCUMENTS

2014/0313902 A1 10/2014 Bruner et al.
2015/0117406 A1* 4/2015 Kim .................. H04W 36/0022
370/331
(Continued)

FOREIGN PATENT DOCUMENTS

EP         2945456 A1    11/2015
KR      20150123785 A    11/2015
WO      2015065267 A1     5/2015

OTHER PUBLICATIONS

International Search Report and Written Opinion for PCT Application No. PCT/US2017/066186 dated Mar. 29, 2018, 10 pages.

*Primary Examiner* — Shukri Abdallah Taha
(74) *Attorney, Agent, or Firm* — Han Santos, PLLC (57) ABSTRACT

Continuous communication during network handovers may ensure the sending and receiving of mission-critical data by over-the-top (OTT) applications is performed without interruption using multiple communication networks. A request from an OTT application to establish a communication session with an IP Multimedia Subsystem (IMS) core of a wireless carrier network for routing communication traffic to the IMS core may be received. Subsequently, an access point name (APN) designated by an APN parameter of the OTT application may be determined. Accordingly, in response to a determination that the APN parameter designates a continuous link APN, the communication traffic may be routed via a communication session that seamlessly switches between a continuous link APN bearer on a radio access network of the wireless carrier network and a continuous link APN tunnel on a remote network that connects to an Evolved Packet Data Gateway (ePDG) of the wireless carrier network.

20 Claims, 7 Drawing Sheets

(51) Int. Cl.
*H04W 76/02* (2009.01)
*H04W 76/04* (2009.01)
*H04W 48/18* (2009.01)
*H04W 72/10* (2009.01)
*H04W 76/25* (2018.01)
*H04W 76/15* (2018.01)
*H04L 29/06* (2006.01)
*H04W 88/16* (2009.01)

(56) References Cited

U.S. PATENT DOCUMENTS

2016/0192232 A1 6/2016 Sachdev et al.
2016/0353331 A1* 12/2016 Sharma ................ H04L 65/105
2016/0373984 A1* 12/2016 Hara ................ H04W 36/0083

* cited by examiner

CONTINUOUS COMMUNICATION FOR PRIORITIZED USER DEVICE APPLICATIONS

BACKGROUND

Mobile telecommunication devices are integral to the daily lives of most users. Originally, mobile telecommunication devices simply provided two-way voice communication between two people at different locations. For example, a voice call normally involves real-time, duplex, synchronous voice communications through a circuit-switched voice network, in which all participants hear the other participants in real time.

More recently, mobile telecommunication devices are also capable of providing data communication. Such data communication may include sending and receiving text and multimedia messages, access information and services provided by online service providers, as well as exchanging data with other nearby devices. LTE Long-Term Evolution (LTE) is a standard for wireless communication of high-speed data for mobile telecommunication devices.

Mobile telecommunication devices may also use other communication networks to exchange voice and data communication with other devices, such as wireless local area networks (WLAN). For example, voice over wireless LAN (VoLAN) is the use of a WLAN deployed according to the IEEE 802.11 standard for voice communication. Recently, wireless telecommunication carriers have implemented technology that makes switch offs (handovers) between a wireless carrier network and a Wi-Fi network during active voice or data communications seamless. In other words, certain voice or data communication sessions that are initiated by a mobile communication device on the wireless carrier network may be handed off to the Wi-Fi network in real-time without disrupting the communication session, or vice versa. Thus, the voice or data communication session may provide continuous communication to an end user of the mobile telecommunication device even as network switches automatically occur. However, the types of voice or data communication that are able to take advantage of this technology have been generally limited to essential carrier communication services, such as voice calling, video calling, or Rich Communication Services (RCS) text messaging.

BRIEF DESCRIPTION OF THE DRAWING S

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for selectively configuring a connection manager on a user device to perform real-time seamless switching of a prioritized communication session for a device application between multiple communication networks. The connection manager may be a service that is provided by an Evolved Packet Data Gateway (ePDG) function of the user device. The prioritized communication session may be a voice communication session or a data communication session of a prioritized over-the-top (OTT) application. The OTT application is an application that is used to access content or service provided by a third-party service provider that is transported to the user device over a communication network operated by a communication carrier. For example, the OTT application may be an asynchronous texting application, a media streaming application, a video sharing application, a control application that controls the functions of remote devices, or a control application that enables a remote controller to control one or more functions of the user device. The real-time seamless switching (handover) of the OTT communication session may enable the session to be transferred from a first type of network (e.g., LTE) to a second type of network (e.g., WLAN) without terminating the OTT communication session on the first network, and then re-establishing the OTT communication session on the second network. Instead, the OTT communication session may remain active during the transfer between the first communication network and the second communication network to provide continuous communication to the device application. In some embodiments, the first network and the second network may be of different types, i.e., the first network and the second network may have different network and transport infrastructures. For example, the first network may be a LTE network, while the second network may be a Wi-Fi network or a satellite-based Broadband Global Area network (BGAN), or vice versa. In contrast, a conventional connection manager on a user device may be configured to provide real-time seamless switching exclusively to carrier communication service applications. The carrier communication service applications may be limited to a voice calling application, a video calling application, or a Rich Communication Services (RCS) text messaging application, or other applications that are provided for use by a wireless carrier that operates a wireless carrier network.

The connection manager as implemented using the current techniques may be configured to detect the presence of a specific APN parameter, also referred to as an APN flag, that is associated with an OTT application of the user device. In various embodiments, the OTT application is a non-carrier communication services application. The specific APN parameter may designate a particular dedicated continuous communication access point name (APN) or a shared continuous communication APN. Accordingly, the specific APN parameter may trigger the connection manager to assign the corresponding dedicated continuous communication APN or shared continuous communication APN to the OTT application. The dedicated continuous communication APN may be used to designate an exclusive combination of communication channels across multiple communication networks for the sole use of the OTT application, in order to provide continuous communication to the device application. Each communication channel may be in the form of an APN bearer or an APN tunnel. In contrast, the shared continuous communication APN may enable the OTT application to route its communications through a combination of shared communication channels across multiple communication networks. The combination of shared communication channels may be a set of communication channels on multiple communication networks that are commonly used by multiple device applications. The combination of shared communication channels may be used by multiple OTT applications to conduct continuous communication sessions without terminating and re-establishing communication sessions.

In alternative embodiments, the specific APN parameter of the OTT application may indicate a priority level rather than designate a particular continuous communication APN. In such embodiments, the connection manager may use an APN assignment table to determine a shared continuous communication APN that corresponds to the priority level indicated by the APN parameter. Subsequently, the connection manager may assign the shared continuous communication APN to the OTT application. Once again, the shared continuous communication APN may enable the device application to route its communications through a combination of shared communication channels across multiple communication networks.

In contrast, an OTT application that lacks the APN parameter, or an OTT application having a APN parameter with a predetermined value (e.g., a null value) may cause the connection manager to assign a non-continuous APN to the device application. The non-continuous APN may be used by the wireless telecommunication carrier to route a communication session of the OTT application through an APN bearer while the user device is using a first network. However, the APN bearer for the communication session may be terminated when the user device switches to a second network, which also results in the termination of the communication session. Accordingly, the user device is forced to establish a new communication session that uses a communication connection created on the second network. In some instances, the termination of the communication session and the establishment of the new communication session may cause OTT application communication to be disrupted as voice or information data packets are lost or misdirected during the transition between networks. Moreover, even if the termination of the communication session and the establishment of the new communication session does not cause data packet loss or misdirection, the termination and establishment may take some time to accomplish. Further, additional time may be consumed in order to establish a communication bearer or a communication connection that carries the new communication session. Such elapse of time may result in the loss of communication continuity that may be vital for performing certain operations.

The techniques may enable the connection manager on a user device to perform real-time seamless switching of a communication session for an OTT application between multiple communication networks. The OTT application may be any non-carrier communication services application that is configured with a APN parameter recognizable by the connection manager. The real-time seamless switch may enable the OTT application to perform continuous communication with network-based application hosts or communication services during network handovers without experiencing communication traffic disruption in the form of interruptions or delays. In contrast, conventional techniques at best limit the ability to perform continuous communication to essential carrier communication applications on a user device, such as voice calling, video calling, or Rich Communication Services (RCS) text messaging applications.

The ability for any prioritized OTT on a user device to take advantage of continuous communication during network handovers may ensure that such OTT applications are able to seamlessly send and receive mission-critical data without interruption or delay using multiple communication networks. For example, in one implementation, a user device may be an unmanned aerial vehicle (UAV), also known as drone. The UAV may be configured to communicate with a ground network operation center (NOC) via multiple communication networks, such as a primary communication network (e.g., LTE network) and a secondary communication network (e.g., satellite-based BGAN). In such an implementation, the OTT application may be a controller application of the UAV that relies the continuous communication to provide telemetry data to a ground network operation center (NOC) and receive control command data from the NOC with minimal risk of catastrophic control failure due to communication loss with a communication network.

In another implementation, a user device may be a remote surgery robot that is used by a physician to perform tele-surgery from a remote location. In such an implementation, the OTT application may be a controller application of the remote surgery robot that provides sensory data to a remote control interface and translates remote robot commands inputted at the interface into movements of the surgical instruments on the surgery robot. In such an implementation, continuous communication during network handovers (e.g. from a Wi-Fi network to a LTE network) may be critical in the event of service interruption or delay in one of the communication networks. In other implementations, additional OTT applications that may benefit from the continuous communication during network handovers provided by the techniques may include OTT applications that perform law enforcement video/audio surveillance and recordings, device applications that provide data and voice communication for military and national security operations, and/or so forth. In some instances, the reduction in the termination of communication sessions and the establishment of new communication sessions may increase the operating efficiency of the multiple communication networks. The techniques described herein may be implemented in a number of ways. Example implementations are provided below with reference to the following FIGS. 1-7.

Example Architecture

Figure 1:
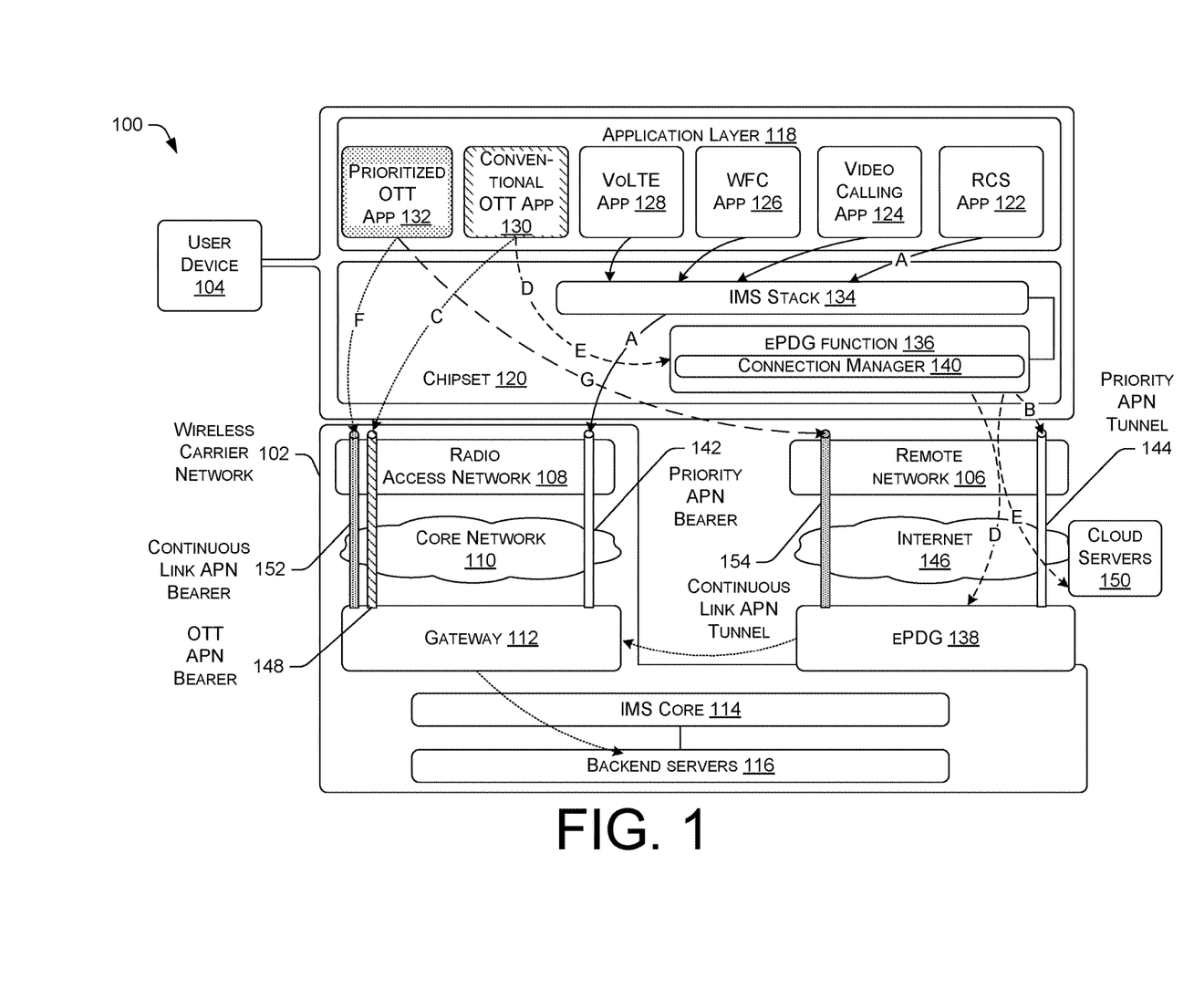
FIG. 1 illustrates an example network architecture for configuring a user device application on a user device for continuous communication over multiple networks during a communication session.

FIG. 1 illustrates an example network architecture for configuring a user device application on a user device for continuous communication over multiple networks during a communication session. The architecture 100 may include multiple communication networks. The multiple communication networks may include a wireless carrier network 102 and a remote network 106 that provide voice and data communication services to multiple user devices, such as the user device 104. The user device 104 may be a feature phone, a smartphone, a tablet computer, a phablet, an embedded computer system, a UAV, a robot, a multimedia recording system, or any other device that is capable of using the wireless communication services that are provided by multiple types of communication networks. The wireless carrier network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth.

The wireless carrier network 102 may include a radio access network 108 and a core network 110. The radio access network may include multiple base stations. The multiple base stations are responsible for handling voice and data traffic between multiple user devices, such as the user device 104, and the core network 110. Accordingly, each of the base stations may provide a corresponding network cell that delivers telecommunication and data communication coverage. The core network 110 may use the network cells to provide communication services to the multiple user devices. For example, the core network 110 may connect the multiple user devices to other telecommunication and data communication networks, such as the Internet and the public switched telephone network (PSTN). The base stations are responsible handling voice and data traffic between user devices and the core network 110. In some embodiments, the base stations may be in the form of eNodeB nodes. Each eNodeB node may include a base transceiver system (BTS) that communicates via an antennae system over an air-link with one or more user devices that are within range. The antenna system of an eNodeB node may include multiple antennae that are mounted on a radio tower to provide a coverage area that is referred to as a "cell." The BTS may send RF signals to user devices and receive radio signals from user devices.

In various embodiments, the core network 110 may include one or more computing devices that implement network components. The network components may include a serving GPRS support node (SGSN) that routes voice calls to and from the PSTN, and a Gateway GPRS Support Node (GGSN) that handles the routing of data communication between external packet switched networks and the core network 110. The core network 110 may further include a policy engine, a billing function, and a gateway 112. The policy engine may be a software component that determines policy and enforces policy rules, and serves to establish calls and allocate bandwidth to call bearers. In various embodiments, the policy engine may be a Policy and Charging Rules Function (PCRF) or another equivalent core network component of the wireless carrier network 102. Accordingly, the policy engine may interface with the AF to handle incoming and outgoing VoLTE and Video over LTE (ViLTE) calls. The billing function may enable the wireless carrier network 102 to monitor the services, such as data, voice, text, etc., that are used by each subscriber, and charge the subscribers in real-time based on service usage. In various embodiments, the billing function may be an Online Charging System (OCS) or another equivalent core network component of the wireless carrier network 102.

The gateway 112 may include one or more servers and related components that are tasked with providing connectivity between an IP Multimedia Subsystem (IMS) core 114 and the user devices (e.g., the user device 104) by acting as a point of entry and exit for data traffic. In turn, the IMS core 114 may provide the user devices with data access to external packet data networks, such as the networks of other wireless telecommunication providers. Accordingly, the gateway 112 may perform functions such as policy enforcement, packet filtering, packet screening, and/or charging support. In various embodiments, the gateway 112 may be an Evolved Packet Data Network Gateway (ePDG) of a LTE network or another equivalent core network component of the wireless carrier network 102.

The IMS core 114 may include an application function (AF). In various embodiments, the AF may be a Proxy Call Session Control Function (P-CSCF) or an equivalent function. In instances in which the AF is the P-CSCF, the P-CSCF may route incoming SIP messages to an IMS registrar server. The P-CSCF may also safeguard the security of the IMS core 114 by handling Internet Protocol Security (IPSec) for communications that are exchanged by the user devices. In some alternative instances, instead of SIP sessions, the P-CSCF may handle Remote Authentication Dial-In User Service (RADIUS) sessions. The P-CSCF may interact with an Interrogating CSCF (I-CSCF) and a Serving CSCF (S-CSCF). The S-CSCF may communicate with a telephony application server (TAS) that resides in the core network 110. The TAS may route voice and/or data communications within the wireless carrier network 102 and with other networks, including public switch telephone networks (PSTNs). For example, the TAS may be a SIP application server that handles IP telephony for voice over LTE (VoLTE) services. Collectively, the CSCFs may handle Session Initiation Protocol (SIP) sessions, which are communication sessions for packet-based voice and video calls, instant messaging over IP networks, and/or so forth. The IMS core 114 may also route packet data traffic to backend servers 116. The backend servers 116 may include servers that are operated by the wireless carrier network 102 to distribute content and provide services. The content may include customer alerts, customer offers, customer incentives, and/or so forth. The services may include messaging services, customer support services, location-based services, mobile commerce services, and/or so forth. In other embodiments, the backend servers 116 may be third-party communication services servers of content service providers that distribute over-the-top (OTT) content or service, such as audio, video, control data, or other media content or service via the wireless carrier network 102. In contrast, the remote network 106 may be any network that is not promulgate based on the $3^{rd}$ Generation Partnership Project (3GPP) specifications. For example, the remote network 106 may be a Wi-Fi network, a satellite-based Broadband Global Area network (BGAN), or another non-3GPP network.

The user device 104 may include an application layer 118 and a chipset 120. The application layer 118 is an abstraction layer that contains device applications and application protocols for data and voice communication. In various embodiments, the applications that are hosted in the application layer 118 may include multiple carrier communication service applications. The carrier communication service applications may include a Rich Communication Service (RCS) application 122, a video calling application 124, a Wi-Fi calling application 126, a Voice over LTE (VoLTE) application 128. In addition to providing Short Message Service (SMS), the RCS application 122 may provide advanced messaging services, such as Multimedia Messaging Service (MMS), and the sharing of device locations. Additionally, the RCS application 122 may provide other features such as attachment of large multimedia files, notification that the other party is typing a message, message delivery notification, and/or so forth. The video calling application 124 may provide packet data-based video telephony that enables voice and video telecommunication over the wireless carrier network 102. The Wi-Fi calling application 126 may provide Voice over wireless LAN (VoWLAN) by using an available wireless broadband network implemented according to IEEE 802.11 standards to carry voice and/or video communication. The VoLTE application 128 may use the IMS core 114 of the wireless carrier network 102 to provide Internet Protocol (IP) data packet-based voice communication services to the user device.

The application layer 118 may further include multiple OTT applications that perform different functions. The multiple OTT applications may include conventional OTT applications (e.g., conventional OTT application 130) and prioritized OTT applications (e.g., prioritized OTT application 132). The conventional OTT applications may be applications that provide non-essential streaming of content, such as a music streaming application that downloads and plays music, or a video sharing application that enables a user to download and upload multimedia files for sharing online. The prioritized OTT applications may be applications that provide essential data communication services that are critical to the operation of the user device 104, and/or affect the health and safety of persons that are operating or impacted by the user device 104. For example, the prioritized OTT application may be a multimedia surveillance application that streams law enforcement surveillance footage to a network operation center (NOC) of a police department. In another example, the user device 104 may be a UAV, and the prioritized OTT application may be a control application that provides real-time flight telemetry information to a ground control device, and receives flight control commands from the ground control device. However, in some embodiments, the prioritized OTT application may be any OTT application that is assigned a high priority than conventional OTT applications by the operator of the wireless carrier network 102.

The chipset 120 may include hardware components that enable the user device 104 to communicate with multiple communication networks, such as the wireless carrier network 102 and a remote network 106. For example, the hardware components may include a processor, a modem, a transceiver, an antenna, and/or so forth. In this way, the user device 104 may transmit data to the multiple communication networks and receive data back from the multiple communication network. The chipset 120 may further include software components that encode and route data to the multiple communication network via the hardware components. In various embodiments, the software components may include an IMS stack 134 and an ePDG function 136.

The IMS stack 134 may provide a selection of interfaces that the applications in the application layer 118 may use to access various IMS services that are provided by the IMS core 114 of the wireless carrier network 102. For example, the IMS services may include communication session services, messaging services, session management services, and/or so forth. The ePDG function 136 may coordinate with the ePDG 138 to secure and transmit data when the user device 104 is connected to the core network 110 of the wireless carrier network 102 via the remote network 106. In various embodiments, the ePDG 138 may act as a termination node for the APN tunnels (e.g., Internet Protocol Security (IPSec)) tunnels or other communication connections that are established between the user device 104 and the wireless carrier network 102. In various embodiments, the ePDG function 136 may provide a connection manager 140. The connection manager 140 may perform real-time seamless switching of a communication session for a prioritized OTT application of the user device 104 between the multiple communication networks.

In one implementation, the user device 104 may access the core network 110 of the wireless carrier network 102 via the radio access network 108. In such a scenario, the IMS stack 134 may route a communication session of a carrier communication service application, such as the RCS application 122, to the gateway 112 through the core network 110 via a priority APN bearer 142 (as shown by route "A"). The communication session may be a voice communication session or a data communication session. The priority APN bearer 142 may be an IMS bearer or a designated carrier communication services bearer that is inaccessible to OTT applications.

However, upon the user device 104 switching from using the radio access network 108 to using the remote network 106, the IMS stack 134 may command the connection manager 140 of the ePDG function 136 to seamlessly route the communication session of the carrier communication service application to the ePDG 138 via a priority APN tunnel 144 (as shown by route "B"). The priority APN tunnel 144 is a communication tunnel that is established between the remote network 106 and the ePDG 138. The priority APN tunnel 144 may be a communication tunnel that is reserved by the ePDG 138 for the carrier communication service applications 122-128. In some instances, the priority APN tunnel 144 may be carried over the Internet 146 on its way to the ePDG 138. In turn, the ePDG 138 is capable of routing packet data traffic to and from the gateway 112. Accordingly, the real-time seamless switch may enable the carrier communication service application to perform continuous communication with network-based service or content hosts during network handovers without experiencing communication traffic interruption or delay. The network-based service or content hosts may include backend servers 116 and cloud servers 150. The seamless switching carried out for a communication session of a carrier communication service application may also be carried out in reverse, i.e., from the remote network 106 to the radio access network 108. In such a scenario, a communication session may be initially carried by the priority APN tunnel 144 and then by the priority APN bearer 142.

In such an implementation, the chipset 120 is not capable of seamlessly switching communication sessions of the conventional OTT application 130 when the user device 104 switches its communication session from the radio access network 108 to the remote network 106. This is because the conventional OTT applications 130 lacks an APN parameter that is possessed by a prioritized OTT application, such as the prioritized OTT application 132. For example, the communication session of the conventional OTT application 130 may be initially routed to the gateway 112 via an OTT APN bearer 148 (as shown by route "C") when the user device 104 is connected to the radio access network 108. However, when the user device 104 switches to the remote network 106, the connection manager 140 of the ePDG function 136 terminates the communication session of the conventional OTT application 130. Subsequently, the connection manager 140 may create a new communication connection on the remote network 106, and then establish a new communication session for the conventional OTT application 130 that uses the new communication connection to directly access the ePDG 138. The ePDG 138 may then route the communication session to the gateway 112.

The new communication session may enable the conventional OTT application 130 to communicate with the backend servers 116 (as shown by route "D") to obtain service or content from the backend servers 116. Alternatively, the connection manager 140 may establish a new communication session for the OTT application 130 that directly accesses cloud servers 150 (as shown by route "E") to enable the conventional OTT application 130 to obtain service or content from the cloud servers 150. However, the termination of the communication session and the establishment of the new communication session may cause communication of the user device 104 to be disrupted (e.g., interrupted or delayed) as voice or information data packets are lost and/or misdirected during the transition between networks. The termination of a communication session and the establishment of a new communication session that disrupts communication of the user device 104 also holds true for when the user device 104 switches from the remote network 106 to the radio access network 108. In such an instance, the connection manager 140 may work together with the IMS stack 134 to terminate and establish the communication sessions.

In contrast, the connection manager 140 of the ePDG function 136 may provide seamless switching of a communication session between multiple networks for a prioritized OTT application, such as the prioritized OTT application 132. The seamless switching of the communication session may be executed by the connection manager 140 through the use of a continuous link APN tunnel that is implemented on the remote network 106. In various embodiments, the prioritized OTT application 132 may be assigned a APN parameter, also referred to as an APN flag. The APN parameter may designate a continuous communication APN for use by the prioritized OTT application 132. The APN parameter may be in the form of metadata that the prioritized OTT application 132 is configured to present to the connection manager 140 of the ePDG function 138 as a part of a communication session request.

Alternatively, the APN parameter may be stored in an APN parameter lookup table that is accessible to the connection manager 140, in which the lookup table stores a APN parameter for each of one or more prioritized OTT applications. Accordingly, the connection manager 140 may check the APN parameter lookup table to determine whether a APN parameter exists for an OTT application upon receiving a communication session request from the OTT application.

Thus, in such a scenario, the prioritized OTT application 132 may request a communication session with the IMS core 114 while the user device 104 is using the radio access network 108. Upon receive the communication session request, the connection manager 140 may determine whether the APN parameter indicates that communication session of the prioritized OTT application 132 is to be routed through a continuous communication APN. Accordingly, if the APN parameter indicates routing through a continuous communication APN, the connection manager 140 may route the communication session of the prioritized OTT application 132 to the gateway 112 via the continuous link APN bearer 152 (as shown by route "F"). As shown in FIG. 1, the continuous link APN bearer 152 is used in lieu the OTT APN bearer 148 that is used for routing communication sessions of conventional OTT applications.

Upon the user device 104 switching from using the radio access network 108 to using the remote network 106, the connection manager 140 of the ePDG function 136 may seamlessly route the communication session of the prioritized OTT application 132 to the ePDG 138 via a continuous link APN tunnel 154 (as shown by route "G"). The continuous link APN tunnel 154 is a communication tunnel that is established between the remote network 106 and the ePDG 138. The continuous link APN tunnel may be reserved for routing the communication traffic of the prioritized OTT application 132, or reserved for routing the communication traffic of multiple types of prioritized OTT applications that include the prioritized OTT application 132. In some instances, the continuous link APN tunnel 154 may be carried over the Internet 146. The communication session of the prioritized OTT application 132 is then routed by the ePDG 138 to the gateway 112. In this way, the communication session of the prioritized OTT application 132 may be seamlessly switched from the radio access network 108 to the remote network 106 without experiencing communication traffic interruption or delay.

However, while the user device 104 is on the radio access network 108, if the APN parameter contains a predetermined value that designates a non-continuous APN, the connection manager 140 may take a different action. Specifically, the connection manager 140 may route the communication session through the OTT APN bearer 148 that is associated with the non-continuous APN. For example, the predetermined value may be the APN of the OTT APN bearer 148 or a null value. Subsequently, when the user device 104 switches to the remote network 106, the connection manager 140 may terminate the communication session that is on the radio access network 108. Afterwards, the connection manager 140 may establish a new communication session over a communication connection between the remote network 106 and the ePDG 138 to replace the terminated communication session. In various embodiments, the communication connection between the remote network 106 and ePDG 138 may be established without the use of an APN, i.e., the communication connection may be a non-APN routed connection. For example, the communication connection may be a Transmission Control Protocol/Internet Protocol session (TCP/IP) a connection, a File Transfer Protocol (FTP) connection, a Hypertext Transfer Protocol (HTTP) connection, a secure HTTP (HTTPS) connection, and/or so forth.

Returning to the instance in which the APN parameter indicates routing through a continuous link APN bearer, the seamless switching may be carried out by the connection manager 140 for the communication session of the prioritized OTT application 132 in reverse, i.e., from the remote network 106 to the radio access network 108. In such an instance, the prioritized OTT application 132 may request a communication session with the IMS core 114 while the user device 104 is using the remote network 106. Upon receive the initiation request, the connection manager 140 may route the communication session of the prioritized OTT application 132 to the ePDG 138 or the cloud servers 150 via a communication connection established over the remote network 106.

Upon the user device 104 switching from using the remote network 106 to using the radio access network 108, the connection manager 140 of the ePDG function 136 may determine whether the APN parameter indicates that communication session of the prioritized OTT application 132 is to be routed through a continuous link APN bearer. Accordingly, if the APN parameter indicates such a case, the connection manager 140 of the ePDG function 136 may seamlessly route the communication session of the carrier communication service application to the gateway 112 via the continuous link APN bearer 152 (as shown by route "F"). In this way, the communication session of the prioritized OTT application 132 may be seamlessly switched from the radio access network 108 to the remote network 106 without experiencing communication traffic interruption or delay, in part by bypassing the use of the OTT APN bearer 148 and the need to establish a new communication connection on the remote network 106.

However, if the APN parameter contains a predetermined value that designates the communication session is to be routed through the OTT APN bearer 148 (e.g., a null value), the connection manager 140 may route the communication session through a communication connection over the remote network 106 while the user device 104 is on the remote network 106. In various embodiments, the communication connection between the remote network 106 and the ePDG 138 may be established without the use of an APN, i.e., the communication connection may be a non-APN routed connection. When the user device 104 switches to the remote network, the connection manager 140 may terminate the communication session. Subsequently, the connection manager 140 may establish a new communication session over the OTT APN bearer 148 to replace the terminated communication session. The new communication session may be used to continue the same voice or data communication for the prioritized OTT application 132 as the terminated communication session.

In various embodiments, the combination of the continuous link APN bearer 152 and the continuous link APN tunnel 154 that is used by the prioritized OTT application 132 may be a dedicated combination or a shared combination. If the combination is a dedicated combination, then the continuous link APN bearer 152 and the continuous link APN tunnel 154 are configured for the exclusive use of the prioritized OTT application 132, or multiple copies of the prioritized OTT application 132 on a plurality of user devices. On other hand, if the combination is a shared combination, then the continuous link APN bearer 152 and the continuous link APN tunnel 154 are configured for use by multiple prioritized OTT applications of various types that are on one or more user devices, in which the multiple prioritized OTT applications may perform different functions.

Furthermore, the seamless communication session switching capability for prioritized OTT applications is illustrated in FIG. 1 with respect to combination of the continuous link APN bearer 152 and the continuous link APN tunnel 154 as used by the prioritized OTT application 132. However, is nevertheless appreciated that the wireless carrier network 102 may include multiple continuous link APN bearers/continuous link APN tunnel combinations of dedicated and/or shared types that function in a similar manner. In some instances, the charging system on the core network 110 of the wireless carrier network 102 may charge a user of the user device 104 different billing schemes depending on whether the communication traffic of the user device 104 is routed through a non-continuous communication APN or a continuous communication APN. In this way, the wireless carrier network 102 may charge a higher fee for providing continuous communication made possible by seamless switching for a prioritized OTT application, and a lower fee for providing conventional communication for a conventional OTT application.

In alternative embodiments, the specific APN parameter of the prioritized OTT application 132 may indicate a priority level rather than designate a particular continuous communication APN. For example, the priority level may be an escalated priority level or a standard priority level. In such embodiments, the connection manager 140 may use an APN assignment table to determine whether the priority level warrants routing a communication session of the prioritized OTT application seamlessly through a combination of the shared continuous link APN bearer 152 and the shared continuous link APN tunnel 154, or routing through a combination of the OTT APN bearer 148 and a communication connection on the remote network 106. For example, an escalated priority level may cause the connection manager 140 to route the communication session through a combination of a continuous link APN bearer and a continuous link APN tunnel. In contrast, a standard priority may cause the connection manager 140 to route the communication session through a combination of an OTT APN bearer 148 on the radio access network 108 and an ad-hoc communication connection on the remote network 206.

In various embodiments, the APN assignment table may be generated or updated by an APN assignment function that executes on a server of the core network 110. Accordingly, the APN assignment function may be responsible for providing the APN assignment table or an update to the table to the user device 104. In turn, the connection manager 140 may store the APN assignment table or the update to the table in a memory of the user device 104 for subsequent use. Further, in some instances, the priority APN bearers 142 and 144, the continuous link APN bearer 152, and the continuous link APN tunnel 154 may be guaranteed to be both instantiated (i.e., does not have to be established thereby causing delays) and available (i.e., is monitored to ensure there is sufficient bandwidth) by the wireless carrier 102 and/or the remote network 106. While the functionalities of the connection manager 140 has been illustrated in FIG. 1, additional details regarding the operations of the connection manager 140 are further provided in FIGS. 3-7.

Example User Device Components

Figure 2:
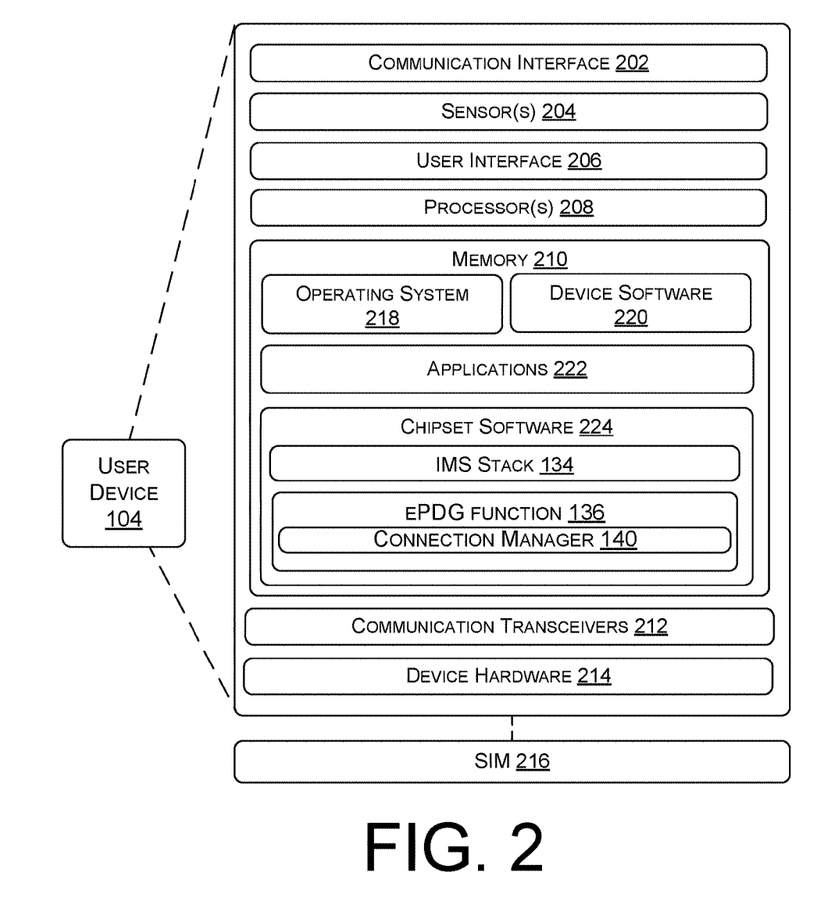
FIG. 2 is a block diagram showing various components of a use device that is configured to enable a user device application on the user device to perform continuous communication over multiple networks during a communication session.

FIG. 2 is a block diagram showing various components of a use device that is configured to enable a device application on the user device to perform continuous communication over multiple networks during a communication session. The user device 104 may include a communication interface 202, one or more sensors 204, a user interface 206, one or more processors 208, and memory 210. The communication interface 202 may include wireless and/or wired communication components that enable the electronic device to transmit or receive voice or data communication via the wireless carrier network 102, as well as other telecommunication and/or data communication networks. The sensors 204 may include a proximity sensor, a compass, an accelerometer, altimeter, cameras, and/or a global positioning system (GPS) sensor. The proximity sensor may detect movement of objects that are proximate the user device 104. The compass, the accelerometer, and the GPS sensor may detect orientation, movement, and geolocation of the user device 104. In instances in which the user device is a UAV, the sensors 204 may further include speed sensors, propulsion setting sensors, flight control surface settings sensors, a transponder interrogator, and/or other flight vehicle sensors.

The user interface 206 may enable a user to provide inputs and receive outputs from the user device 104. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The user device 104 may also include communication transceivers 212 and other device hardware 214. The communication transceivers are hardware components that enable the user device 104 to perform telecommunication and data communication with the multiple communications network, such as the wireless carrier network 102 and the remote network 106. The device hardware 214 may include other hardware that is typically located in a mobile telecommunication device. For example, the device hardware 214 may include signal converters, transceivers, antennas, hardware decoders and encoders, graphic processors, a SIM card slot, and/or the like that enable the user device 104 to execute applications and provide telecommunication and data communication functions. The SIM 216 may be an integrated circuit chip that is inserted into the SIM card slot of the user device 104, or an embedded SIM that is hardwired into the circuit board of the user device 104. In instances in which the user device is a UAV, the device hardware 214 may further include propulsion engines and flight control surfaces.

The one or more processors 208 and the memory 210 of the user device 104 may implement an operating system 218, device software 220, one or more applications 222, and chipset software 224. The various software and applications may include routines, program instructions, objects, and/or data structures that perform particular tasks or implement particular abstract data types. The operating system 218 may include components that enable the user device 104 to receive and transmit data via various interfaces (e.g., user controls, communication interface 202, and/or memory input/output devices). The operating system 218 may also process data using the one or more processors 208 to generate outputs based on inputs that are received via the user interface 206. For example, the operating system 218 may provide an execution environment for the execution of the applications 222. The operating system 218 may include a presentation component that presents the output (e.g., display the data on an electronic display, store the data in memory, transmit the data to another electronic device, etc.).

The operating system 218 may include an interface layer that enables applications to interface with the communication transceivers 212 and/or the communication interface 202. The interface layer may comprise public APIs, private APIs, or a combination of both public APIs and private APIs. Additionally, the operating system 218 may include other components that perform various other functions generally associated with an operating system. The device software 220 may include software components that enable the user device to perform functions. For example, the device software 220 may include basic input/output system (BIOS), Boot ROM, or a bootloader that boots up the user device 104 and executes the operating system 218 following power up of the device.

The applications 222 may include applications that provide utility, entertainment, and/or productivity functionalities to a user of the user device 104. For example, the applications 222 may include the RCS application 122, the video calling application 124, the Wi-Fi calling application 126, the VoLTE application 128, and the OTT applications 130 and 132. The applications 222 may further include electronic mail applications, remote desktop applications, web browser applications, navigation applications, office productivity applications, multimedia streaming applications, and/or so forth. In instances in which the user device 104 is a UAV, the prioritized OTT application 132 may be an application that obtain flight telemetry information from the sensors 204, provides the telemetry information to a ground control device, and receiving flight control commands from the ground control device. The chipset software 224 may include applications that implement the IMS stack 134 and the ePDG function 136, as well as other applications that encodes and routes data to the multiple communication network via the hardware components of the chipset 120.

Example Processes

FIGS. 3-7 present illustrative processes 300-700 for providing continuous communication over multiple networks during a communication session to a prioritized OTT application on a user device. Each of the processes 300-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in mirror to implement the process. For discussion purposes, the processes 300-700 are described with reference to the architecture 100 of FIG. 1.

Figure 3:
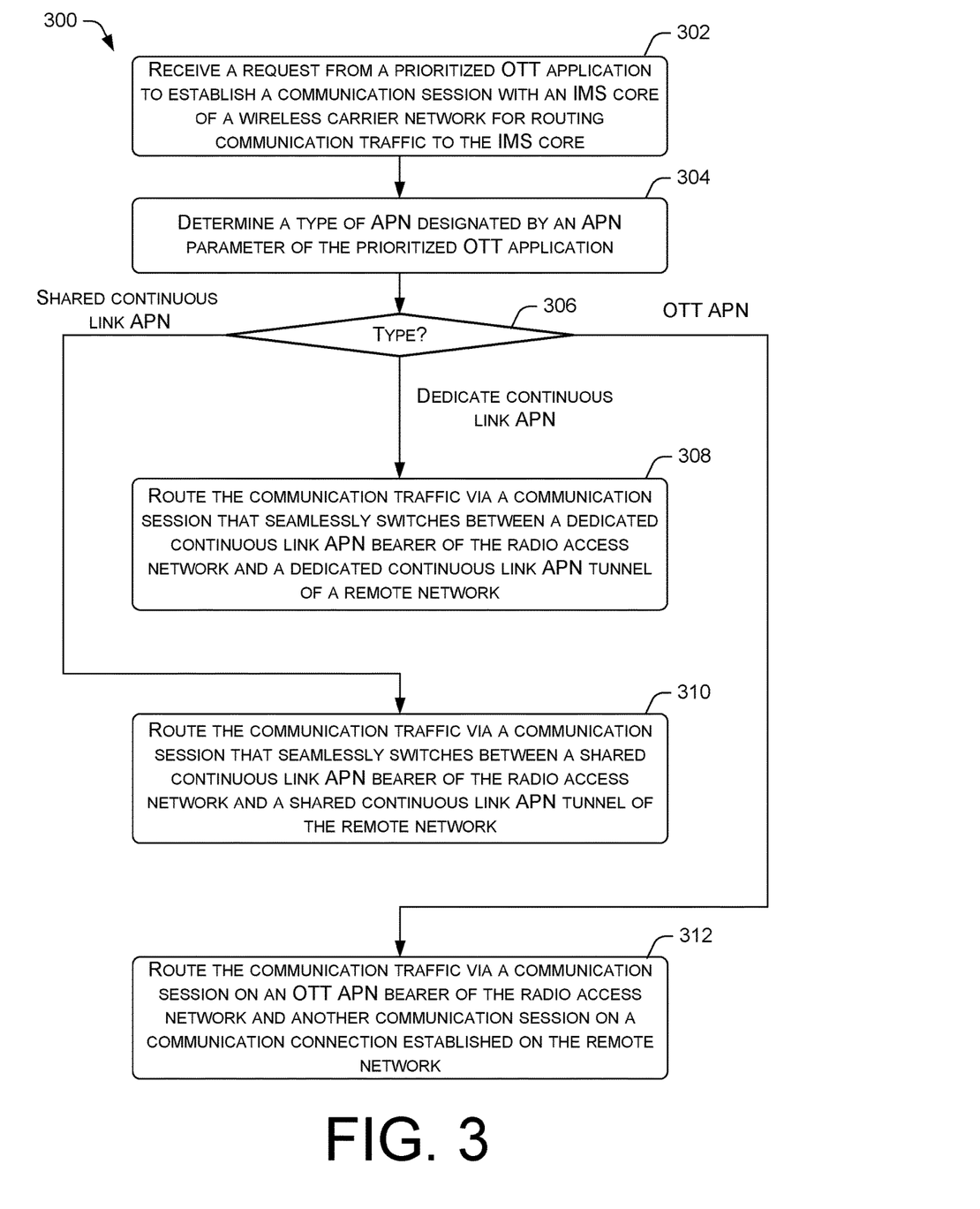
FIG. 3 is a flow diagram of an example process for selectively routing a communication session of a prioritized over-the-top (OTT) application based on a communication route combination indicated by an Access Point Name (APN) parameter of the prioritized OTT application.

FIG. 3 is a flow diagram of an example process 300 for selectively routing a communication session of a prioritized OTT application based on a communication route combination indicated by an APN parameter of the prioritized OTT application. At block 302, the connection manager 140 may receive a request from the prioritized OTT application 132 of a user device 104 to establish a communication session with the IMS core 114 of the wireless carrier network 102. The connection manager 140 may be implemented by a ePDG function 136 of the user device 104. In various embodiments, the user device 104 may be using a radio access network 108 of the wireless carrier network 102.

At block 304, the connection manager 140 may determine a type of APN designated by a APN parameter of the prioritized OTT application 132 that sent the request for the communication session. In various embodiments, the APN parameter may be in the form of metadata that the prioritized OTT application 132 is configured to present to the connection manager 140 as a part of a communication session request. Alternatively, the APN parameter may be stored in an APN parameter lookup table. Accordingly, the connection manager 140 may check the table to determine a APN parameter for the prioritized OTT application 132 upon receiving a communication session request from the prioritized OTT application 132.

At decision block 306, if the connection manager 140 determines that the APN parameter of the prioritized OTT application 132 designates a dedicated continuous link APN bearer, the process 300 may proceed to block 308. At block 308, the connection manager 140 may route the communication traffic of the prioritized OTT application via a communication session that seamlessly switches between a dedicated continuous link APN bearer of the radio access network 108 and a dedicated continuous link APN tunnel of the remote network 106. In various embodiments, dedicated may denote the fact that the APN bearer on the radio access network 108 and the APN tunnel on the remote network 106 are configured to exclusively route the communication traffic of the prioritized OTT application 132.

However, if at decision block 306 the connection manager 140 determines that the APN parameter of the prioritized OTT application 132 designates a shared continuous link APN bearer, the process 300 may proceed to block 310. At block 310, the connection manager 140 may route the communication traffic of the prioritized OTT application via a communication session that seamlessly switches between a shared continuous link APN bearer of the radio access network 108 and a shared continuous link APN tunnel of the remote network 106. In various embodiments, shared may denote the fact that the APN bearer on the radio access network 108 and the APN tunnel on the remote network 106 are configured to route the communication traffic of multiple prioritized OTT applications, in which the multiple prioritized OTT applications may be of different types.

Returning to decision block 306, if the connection manager 140 determines that the APN parameter of the prioritized OTT application 132 designates an OTT APN, the process 300 may proceed to block 312. At block 312, the connection manager 140 may route the communication traffic of the prioritized OTT application via a communication session on an OTT APN bearer (e.g., OTT APN bearer 148) of the radio access network 108 and another communication session on a communication connection established on the remote network 106. In various embodiments, the termination and re-establishment of the communication sessions may cause the communication traffic to be disrupted as voice or information data packets are lost or misdirected during the transition between networks.

Figure 4:
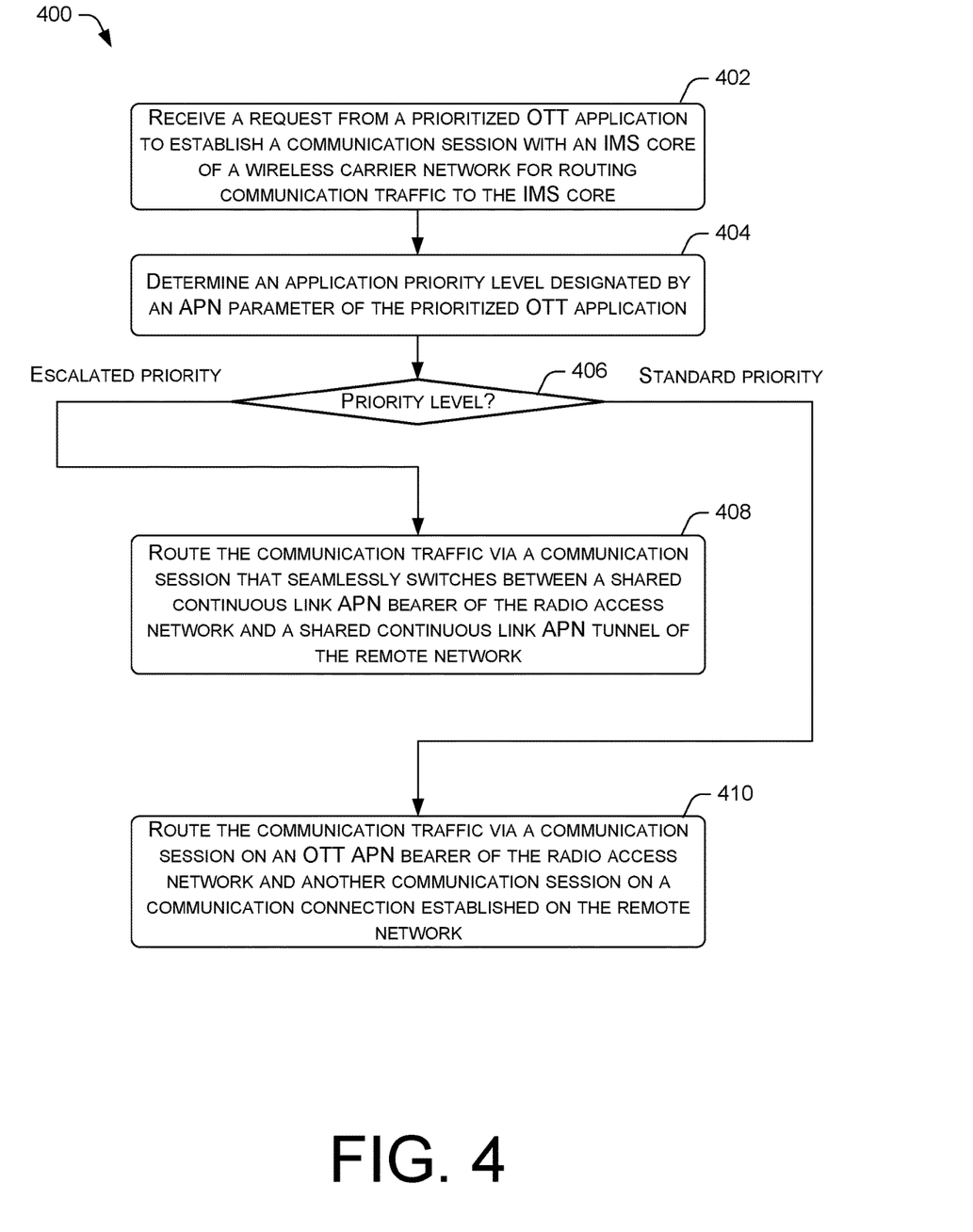
FIG. 4 is a flow diagram of an example process for selectively routing a communication session of a prioritized OTT application based on an application priority level indicated by an APN parameter of the prioritized OTT application.

FIG. 4 is a flow diagram of an example process 400 for selectively routing a communication session of a prioritized OTT application based on an application priority level indicated by an APN parameter of the prioritized OTT application. At block 402, the connection manager 140 may receive a request from the prioritized OTT application 132 of a user device 104 to establish a communication session with the IMS core 114 of the wireless carrier network 102. The connection manager 140 may be implemented by a ePDG function 136 of the user device 104. In various embodiments, the user device 104 may be using a radio access network 108 of the wireless carrier network 102.

At block 404, the connection manager 140 may determine an application priority level designated by a APN parameter of the prioritized OTT application 132 that sent the request for the communication session. In various embodiments, the APN parameter may be in the form of metadata that the prioritized OTT application 132 is configured to present to the connection manager 140 as a part of a communication session request. Alternatively, the APN parameter may be stored in an APN parameter lookup table. Accordingly, the connection manager 140 may check the table to determine a APN parameter for the prioritized OTT application 132 upon receiving a communication session request from the prioritized OTT application 132.

At decision block 406, if the connection manager 140 determines that the priority level is an escalated priority level, the process 400 may proceed to block 408. At block 408, the connection manager 140 may route the communication traffic of the prioritized OTT application via a communication session that seamlessly switches between a shared continuous link APN bearer of the radio access network 108 and a shared continuous link APN tunnel of the remote network 106. In various embodiments, shared may denote the fact that the APN bearer on the radio access network 108 and the APN tunnel on the remote network 106 are configured to route the communication traffic of multiple prioritized OTT applications, in which the multiple prioritized OTT applications may be of different types.

Returning to decision block 406, if the connection manager 140 determines that the priority level is a standard priority, the process 400 may proceed to block 410. At block 410, the connection manager 140 may route the communication traffic of the prioritized OTT application via a communication session on an OTT APN bearer (e.g., OTT APN bearer 148) of the radio access network 108 and another communication session on a communication connection established over the remote network 106. In various embodiments, the termination and re-establishment of the communication sessions may cause the communication traffic to be disrupted as voice or information data packets are lost or misdirected during the transition between networks.

Figure 5:
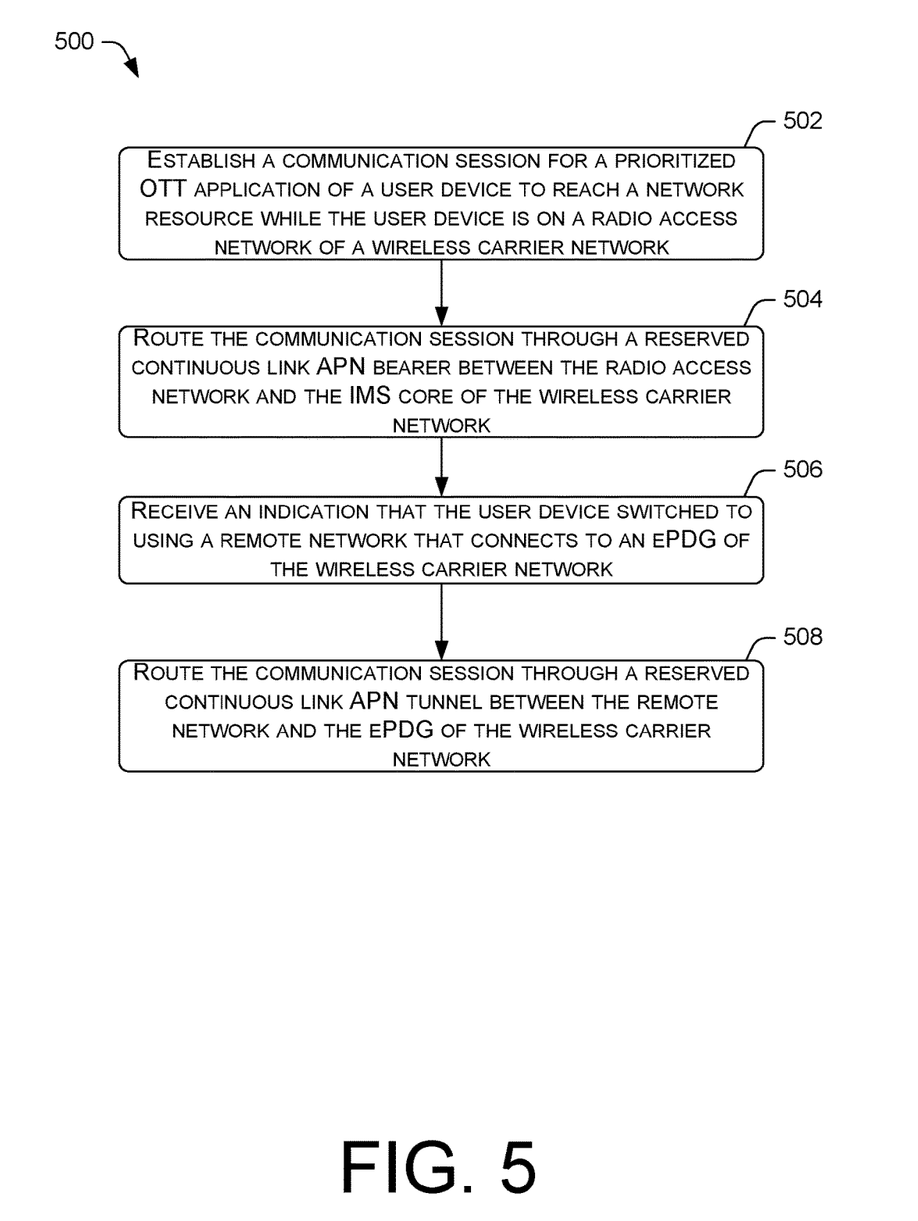
FIG. 5 is a flow diagram of an example process for transitioning a communication session of a prioritized OTT application from a reserved continuous link APN bearer to a reserved continuous link APN tunnel when a user device switches from using a radio access network of a wireless carrier network to using a remote network.

FIG. 5 is a flow diagram of an example process 500 for transitioning a communication session of a prioritized OTT application from a reserved continuous link APN bearer to a reserved continuous link APN tunnel when a user device switches from using a radio access network of a wireless carrier network to using a remote network. At block 502, the connection manager 140 may direct the IMS stack 134 to establish a communication session for the prioritized OTT application 132 of a user device 104 to reach a network resource while the user device is on the radio access network 108 of the wireless carrier network 102. In various embodiments, the network resource may be a service provided by a network service provider or content provided by a content provider. For example, the network resource may be provided by the backend servers 116 or the cloud servers 150.

At block 504, the IMS stack 134 may route the communication session through a reserved continuous link APN bearer between the radio access network 108 and the IMS core 114 of the wireless carrier network 102. In various embodiments, the reserved continuous link APN bearer may be a dedicated continuous link APN bearer that is configured to exclusively route the communication traffic of the prioritized OTT application 132, or a shared continuous link APN bearer that is configured to route the communication traffic of multiple prioritized OTT applications.

At block 506, the connection manager 140 may receive an indication that the user device 104 switched to using the remote network 106 that connects to the ePDG 138 of the wireless carrier network 102. The remote network 106 may be a Wi-Fi network, a satellite-based Broadband Global Area network (BGAN), or another non-3GPP network. In various embodiments, the connection manager 140 may receive the indication from the ePDG function 136 of the chipset 120.

At block 508, the connection manager 140 may route the communication session through a reserved continuous link APN tunnel between the remote network 106 and the ePDG 138 of the wireless carrier network 102. In various embodiments, the reserved continuous link APN tunnel may be a dedicated continuous link APN tunnel that is configured to exclusively route the communication traffic of the prioritized OTT application 132, or a shared continuous link APN tunnel that is configured to route the communication traffic of multiple prioritized OTT applications.

Figure 6:
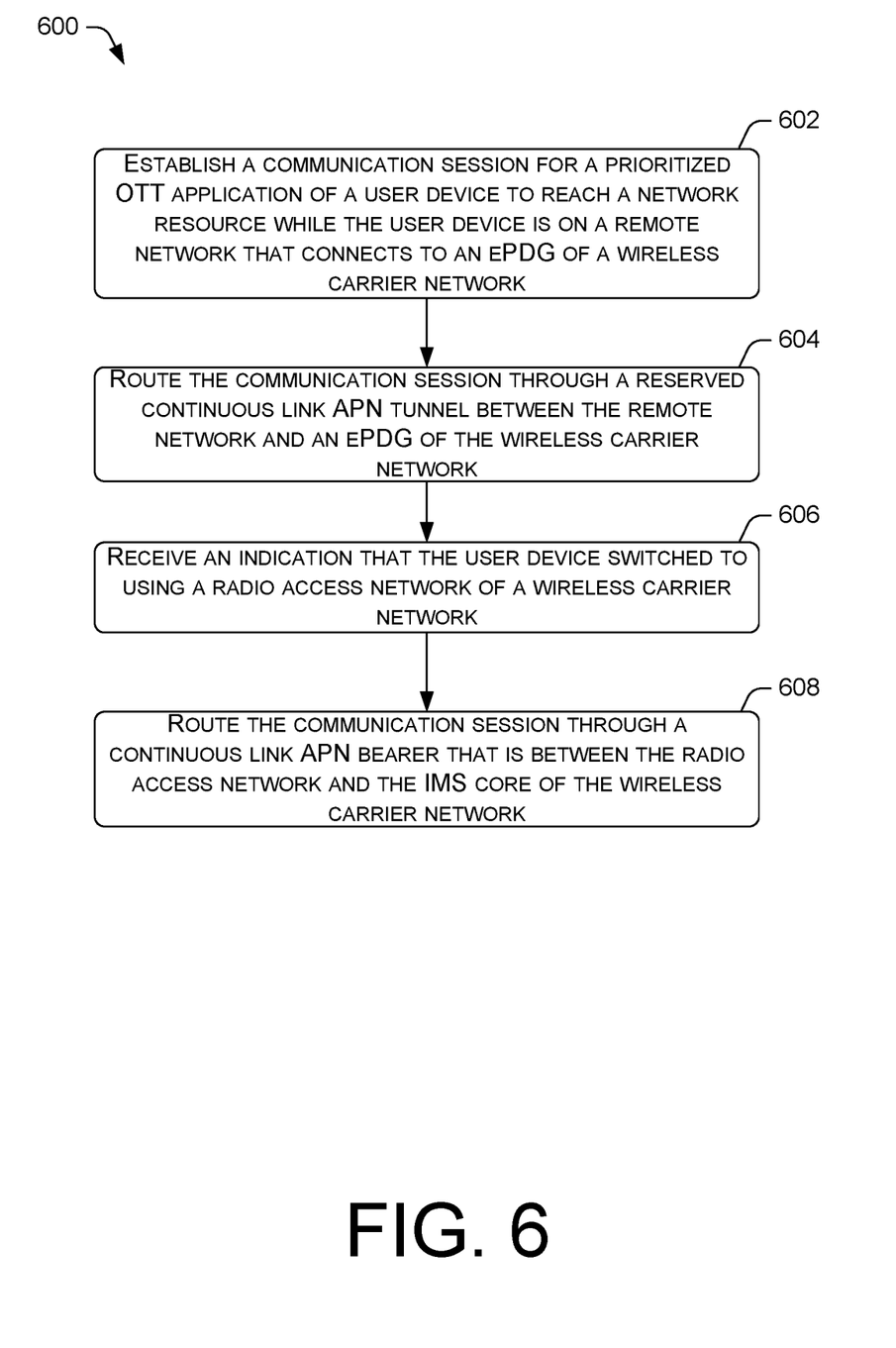
FIG. 6 is a flow diagram of an example process for transitioning a communication session of a prioritized OTT application from a reserved continuous link APN tunnel to a reserved continuous link APN bearer when a user device switches from using remote network to using a radio access network of a wireless carrier network.

FIG. 6 is a flow diagram of an example process 600 for transitioning a communication session of a prioritized OTT application from a reserved continuous link APN tunnel to a reserved continuous link APN bearer when a user device switches from using remote network to using a radio access network of a wireless carrier network. At block 602, the connection manager 140 may direct the ePDG function 136 to establish a communication session for the prioritized OTT application 132 of a user device 104 to reach a network resource while the user device is on the remote network 106. The remote network 106 may be connected to an ePDG 138 of the wireless carrier network 102. The remote network 106 may be a Wi-Fi network, a satellite-based Broadband Global Area network (BGAN), or another non-3GPP network. In various embodiments, the network resource may be a service provided by a network service provider or content provided by a content provider. For example, the network resource may be provided by the backend servers 116 or the cloud servers 150.

At block 604, the connection manager 140 may route the communication session through a reserved continuous link APN tunnel between the remote network 106 and the ePDG 138 of the wireless carrier network 102. In various embodiments, the reserved continuous link APN tunnel may be a dedicated continuous link APN tunnel that is configured to exclusively route the communication traffic of the prioritized OTT application 132, or a shared continuous link APN tunnel that is configured to route the communication traffic of multiple prioritized OTT applications.

At block 606, the connection manager 140 may receive an indication that the user device 104 switched to using the radio access network 108 of the wireless carrier network 102. In various embodiments, the connection manager 140 may receive the indication from the ePDG function 136 of the chipset 120.

At block 608, the connection manager 140 may direct the IMS stack 134 to route the communication session through a reserved continuous link APN bearer between the radio access network 108 and the IMS core 114 of the wireless carrier network 102. In various embodiments, the reserved continuous link APN bearer may be a dedicated continuous link APN bearer that is configured to exclusively route the communication traffic of the prioritized OTT application 132, or a shared continuous link APN bearer that is configured to route the communication traffic of multiple prioritized OTT applications.

Figure 7:
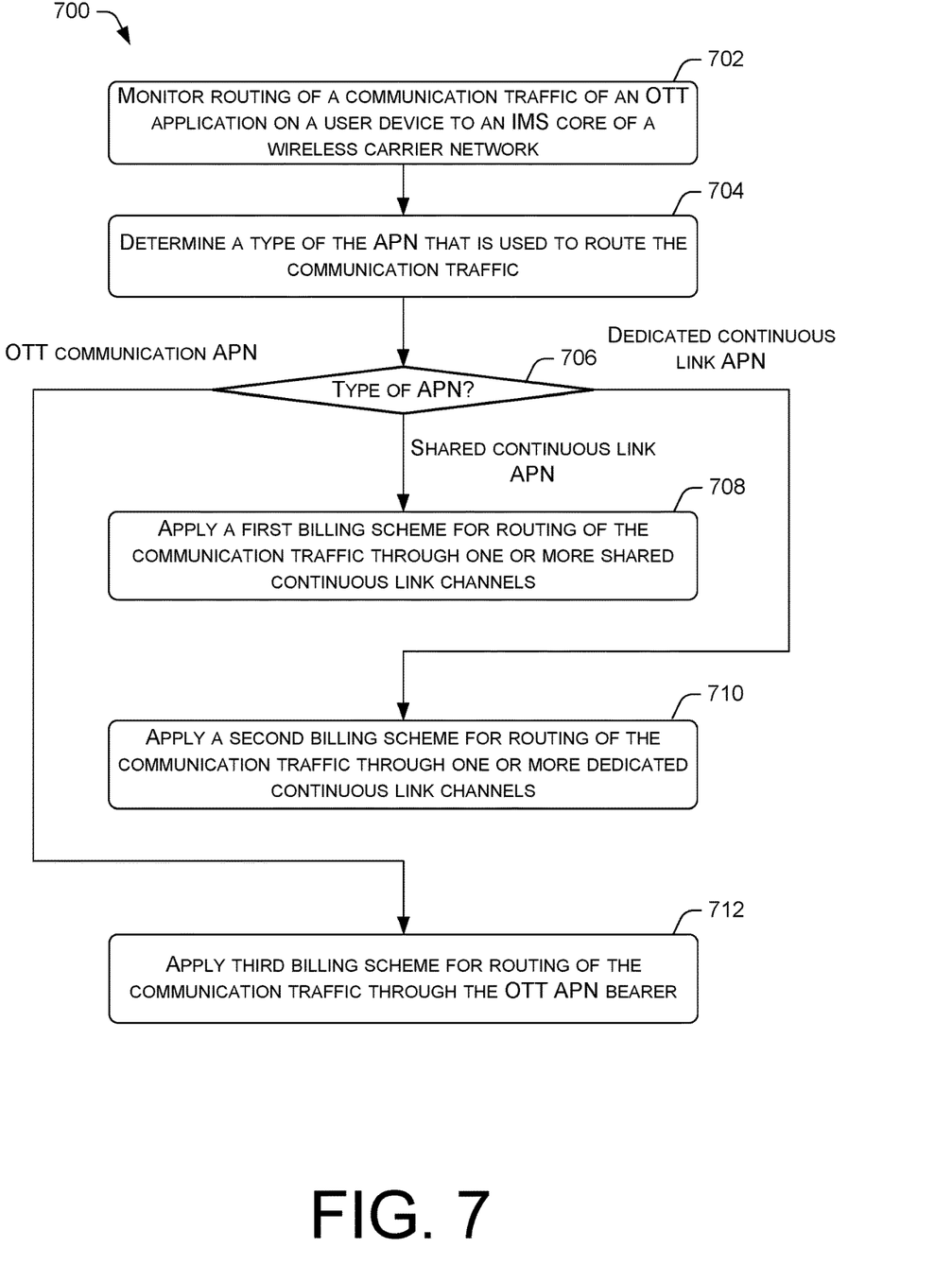
FIG. 7 is a block diagram showing an example process for applying a billing scheme to communication traffic of a user device based a type of the APN that is used to route the communication traffic.

FIG. 7 is a block diagram showing an example process 700 for applying a billing scheme to communication traffic of a user device based on the association of the communication with a continuous communication APN or a non-continuous APN. At block 702, a billing function of the wireless carrier network 102 may monitor routing of communication traffic of an OTT application to an IMS core of a wireless carrier network. In various embodiments, the OTT application may be a conventional OTT application (e.g., conventional OTT application 130) or a prioritized OTT application (e.g., prioritized OTT application 132).

At block 704, the billing function determine a type of the APN that is used to route the communication traffic. In various embodiments, the APN may be an OTT communication APN, a dedicated continuous communication APN, or a shared continuous communication APN. The OTT communication APN may provide the routing of the communication traffic via a communication session that uses the OTT APN bearer 148 of the radio access network 108 and another communication session on a communication connection established on the remote network 106.

The dedicated continuous communication APN may provide the routing communication traffic via a communication session that seamlessly switches between dedicated continuous communication channels. The dedicated continuous communication channels may include a dedicated continuous link APN bearer of the radio access network 108 and a dedicated continuous link APN tunnel of the remote network 106. On the other hand, the shared continuous communication APN may provide the routing of the communication traffic via a communication session that seamlessly switches between shared continuous communication channels. The shared continuous communication channels may include a shared continuous link APN bearer of the radio access network 108 and a shared continuous link APN tunnel of the remote network 106.

Thus, at decision block 706, if the billing function determines that the communication traffic is routed using a shared continuous communication APN, the process 700 may proceed to block 708. At block 708, the billing function may apply a first billing scheme for routing of the communication traffic through one or more shared continuous communication channels. However, if the billing function determines that the communication traffic is routed using a dedicated continuous communication APN, the process 700 may proceed to block 710. At block 710, the billing function may apply a second billing scheme for routing of the communication traffic through one or more dedicated continuous communication channels. Further, if the billing function determines that the communication traffic is routed using an OTT communication APN, the process 700 may proceed to block 712. At block 712, the billing function may apply a third billing scheme for routing of the communication traffic through the OTT APN bearer. The first billing scheme may charge a user of the user device more fees than the second billing scheme, while the second billing scheme may charge the user more fees than the third billing scheme.

The ability for any prioritized OTT application on a user device to take advantage of continuous communication during network handovers may ensure that such OTT applications are able to seamlessly send and receive mission-critical data without interruptions or delays using multiple communication networks.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a user device storing computer-executable instructions that upon execution cause one or more processors to perform acts comprising:
receiving a request from an over-the-top (OTT) application to establish a communication session with an IP Multimedia Subsystem (IMS) core of a wireless carrier network for routing communication traffic to the IMS core;
determining an access point name (APN) designated by an APN parameter of the OTT application;
in response to a determination that the APN parameter designates a continuous communication APN, routing the communication traffic via a first communication session that seamlessly switches between a continuous link APN bearer on a radio access network of the wireless carrier network and a continuous link APN tunnel on a remote network that connects to an Evolved Packet Data Gateway (ePDG) of the wireless carrier network without interrupting the first communication session; and
in response to a determination that the APN parameter designates a non-continuous communication APN, routing the communication traffic via at least one of a second communication session on an OTT APN bearer of the radio access network, or a third communication session on a communication connection established on the remote network that connects to the Evolved Packet Data Gateway (ePDG) of the wireless carrier network, the communication connection being a non-APN routed connection.

2. The one or more non-transitory computer-readable media of claim 1, wherein the routing the communication traffic via at least one of the second communication session or the third communication session includes terminating one communication session prior to establishing another communication session, where the terminating and the establishing creates interruptions or delays that disrupts the routing of the communication traffic for the OTT application, and wherein routing the communication traffic via the first communication session eliminates the interruptions or the delays.

3. The one or more non-transitory computer-readable media of claim 1, wherein the wireless carrier network is 3$^{rd}$ Generation Partnership Project (3GPP)-based network, and a remote network is a non-3GPP network.

4. The one or more non-transitory computer-readable media of claim 3, wherein the remote network is a Wi-Fi network or a satellite-based Broadband Global Area network (BGAN).

5. The one or more non-transitory computer-readable media of claim 1, wherein the user device is an unmanned aerial vehicle (UAV), and the OTT application is a control application of the UAV that provides flight telemetry information to a ground control device, and receives flight control commands from the ground control device.

6. The one or more non-transitory computer-readable media of claim 1, wherein the OTT application is an application that provide data communication services that affect operation of the user device, or an application that affect health and safety of a person that is operating or impacted by the user device.

7. The one or more non-transitory computer-readable media of claim 1, wherein the continuous link APN bearer is a dedicated APN bearer and the continuous link APN tunnel is a dedicated APN tunnel, wherein each of the dedicated APN bearer and the dedicated APN tunnel is for exclusively routing the communication sessions of the OTT application on the user device or multiple instances of the OTT application on multiple user devices.

8. The one or more non-transitory computer-readable media of claim 1, wherein the continuous link APN bearer is a shared APN bearer and the continuous link APN tunnel is a shared APN tunnel, wherein each of the shared APN bearer and the shared APN tunnel is for routing communication sessions of multiple OTT applications that perform different functions.

9. The one or more non-transitory computer-readable media of claim 1, wherein the continuous link APN bearer on the radio access network of the wireless carrier network and the continuous link APN tunnel on the remote network are guaranteed to be instantiated and available for routing the first communication session.

10. The one or more non-transitory computer-readable media of claim 1, wherein the routing the communication traffic via the first communication session includes:
establishing the first communication session for the OTT application to reach a network resource while the user device is on the radio access network of the wireless carrier network;
routing the first communication session through the continuous link APN bearer between the radio access network and the IMS core of the wireless carrier network;
receiving an indication that the user device switched to using the remote network that connects to the ePDG of the wireless carrier network; and
routing the first communication session through the continuous link APN tunnel between the remote network and the ePDG of the wireless carrier network.

11. The one or more non-transitory computer-readable media of claim 1, wherein the routing the communication traffic via the first communication session includes:
establishing the first communication session for the OTT application to reach a network resource while the user device is on the remote network that connects to the ePDG of the wireless carrier network;
routing the first communication session through the continuous link APN tunnel between the remote network and the ePDG of the wireless carrier network;
receiving an indication that the user device switched to using the radio access network of the wireless carrier network; and
routing the first communication session through the continuous link APN bearer between the radio access network and the IMS core of the wireless carrier network.

12. The one or more non-transitory computer-readable media of claim 1, wherein the acts further comprise:
applying a billing scheme for the routing of the communication traffic through at least one of the continuous link APN bearer or the continuous link APN tunnel; and
applying an additional billing scheme for the routing of the communication through at least the OTT APN bearer, wherein the billing scheme charges a user of the user device a higher fee than the additional billing scheme.

13. A computer-implemented method, comprising:
receiving a request from an over-the-top (OTT) application on a user device to establish a communication session with an IP Multimedia Subsystem (IMS) core of a wireless carrier network for routing communication traffic to the IMS core;
determining, via a connection manager on the user device, an application priority level indicated by an APN parameter of the OTT application;
in response to a determination that the APN parameter designates a first priority level, routing, via the connection manager, the communication traffic via a first communication session that seamlessly switches between a continuous link APN bearer on a radio access network of the wireless carrier network and a continuous link APN tunnel on a remote network that connects to an Evolved Packet Data Gateway (ePDG) of the wireless carrier network without interrupting the first communication session; and
in response to a determination that the APN parameter designates a second priority level, routing, via the connection manager, the communication traffic via a second communication session on an OTT APN bearer on the radio access network, and a third communication session on a communication connection established on the remote network that connects to the Evolved Packet Data Gateway (ePDG) of the wireless carrier network, the communication connection being a non-APN routed connection.

14. The computer-implemented method of claim 13, wherein the wireless carrier network is $3^{rd}$ Generation Partnership Project (3GPP)-based network, and a remote network is a non-3GPP network.

15. The computer-implemented method of claim 13, wherein the user device is an unmanned aerial vehicle (UAV), and the OTT application is a control application of the UAV that provides flight telemetry information to a ground control device, and receives flight control commands from the ground control device.

16. The computer-implemented method of claim 13, wherein the continuous link APN bearer is a dedicated APN bearer and the continuous link APN tunnel is a dedicated APN tunnel, wherein each of the dedicated APN bearer and the dedicated APN tunnel is for exclusively routing the communication sessions of the OTT application on the user device or multiple instances of the OTT application on multiple user devices.

17. The computer-implemented method of claim 13, wherein the continuous link APN bearer is a shared APN bearer and the continuous link APN tunnel is a shared APN tunnel, wherein each of the shared APN bearer and the shared APN tunnel is for routing communication sessions of multiple OTT applications that perform different functions.

18. The computer-implemented method of claim 13, wherein the routing the communication traffic via the first communication session includes:
establishing the first communication session for the OTT application to reach a network resource while the user device is on the radio access network of the wireless carrier network;
routing the first communication session through the continuous link APN bearer between the radio access network and the IMS core of the wireless carrier network;
receiving an indication that the user device switched to using the remote network that connects to the ePDG of the wireless carrier network; and
routing the first communication session through the continuous link APN tunnel between the remote network and the ePDG of the wireless carrier network.

19. The computer-implemented method of claim 13, wherein the routing the communication traffic via the first communication session includes:
establishing the first communication session for the OTT application to reach a network resource while the user device is on the remote network that connects to the ePDG of the wireless carrier network;
routing the first communication session through the continuous link APN tunnel between the remote network and the ePDG of the wireless carrier network;
receiving an indication that the user device switched to using the radio access network of the wireless carrier network; and
routing the first communication session through the continuous link APN bearer between the radio access network and the IMS core of the wireless carrier network.

20. A user device, comprising:
one or more processors; and
memory having instructions stored therein, the instructions, when executed by the one or more processors, cause the one or more processors to perform acts comprising:
receiving a request from an over-the-top (OTT) application to establish a communication session with an IP Multimedia Subsystem (IMS) core of a wireless carrier network for routing communication traffic to the IMS core;
determining an access point name (APN) designated by an APN parameter of the OTT application;
in response to a determination that the APN parameter designates a first APN, routing the communication traffic via a first communication session that seamlessly switches between a dedicated continuous link APN bearer on a radio access network of the wireless carrier network and a dedicated continuous link APN tunnel on a remote network that connects to an Evolved Packet Data Gateway (ePDG) of the wireless carrier network without interrupting the first communication session; and
in response to a determination that the APN parameter designates a second APN, routing the communication traffic via a second communication session that seamlessly switches between a shared continuous link APN bearer on a radio access network of the wireless carrier network and a shared continuous link APN tunnel on a remote network that connects to an Evolved Packet Data Gateway (ePDG) of the wireless carrier network without interrupting the communication session,
wherein each of the dedicated continuous link APN bearer and the dedicated continuous link APN tunnel is for exclusively routing the communication sessions of the OTT application on the user device or multiple instances of the OTT application on multiple user devices, and each of the shared continuous link APN bearer and the shared continuous link APN tunnel is for routing communication sessions of multiple OTT applications that perform different functions.

* * * * *